US008755560B2

(12) United States Patent
White

(10) Patent No.: US 8,755,560 B2
(45) Date of Patent: Jun. 17, 2014

(54) SYSTEMS AND METHODS FOR REVERSIBLE, INCREMENTAL IMAGE SHREDDING

(76) Inventor: Tom White, Los Angeles, CA (US)

( * ) Notice: Subject to any disclaimer, the term of this patent is extended or adjusted under 35 U.S.C. 154(b) by 369 days.

(21) Appl. No.: 13/217,460

(22) Filed: Aug. 25, 2011

(65) Prior Publication Data

US 2012/0051641 A1    Mar. 1, 2012

Related U.S. Application Data

(60) Provisional application No. 61/376,901, filed on Aug. 25, 2010.

(51) Int. Cl.
*G06K 9/00* (2006.01)
(52) U.S. Cl.
USPC .......................................... 382/100; 380/210
(58) Field of Classification Search
USPC .......................................... 380/210, 216, 268
See application file for complete search history.

(56) References Cited

U.S. PATENT DOCUMENTS

| 6,256,398 | B1 * | 7/2001 | Chang | 382/100 |
|---|---|---|---|---|
| 6,819,776 | B2 * | 11/2004 | Chang | 382/100 |
| 7,120,607 | B2 * | 10/2006 | Bolle et al. | 705/64 |
| 8,267,321 | B2 * | 9/2012 | Kuyper-Hammond et al. | 235/462.09 |
| 8,422,779 | B2 * | 4/2013 | Deshpande | 382/166 |
| 8,462,949 | B2 * | 6/2013 | Anderson et al. | 380/252 |
| 2004/0019570 | A1 * | 1/2004 | Bolle et al. | 705/64 |
| 2005/0002585 | A1 * | 1/2005 | Brauckmann et al. | 382/254 |
| 2005/0123136 | A1 * | 6/2005 | Shin et al. | 380/217 |
| 2007/0076868 | A1 * | 4/2007 | Ming | 380/54 |

* cited by examiner

*Primary Examiner* — Shefali Goradia
(74) *Attorney, Agent, or Firm* — KPPB LLP

(57) ABSTRACT

Systems and methods for reversible, incremental image shredding in accordance with embodiments of the invention are described. One embodiment of the invention includes determining shredding parameters, generating a shredding map, where the shredding map is a grid of elements that indicates destination locations for at least two of the elements in the grid, and incrementally shredding the image by iteratively mapping blocks of pixels corresponding to grid elements of the shredding map to the destination locations indicated by the shredding map.

15 Claims, 10 Drawing Sheets

SYSTEMS AND METHODS FOR REVERSIBLE, INCREMENTAL IMAGE SHREDDING

CROSS-REFERENCES TO RELATED APPLICATIONS

The present invention claims priority to U.S. Provisional Patent Application No. 61/376,901 filed Aug. 25, 2010, the disclosure of which is incorporated by reference herein in its entirety.

FIELD OF THE INVENTION

The present invention relates generally to a method of creating images that are encoded for secrecy or security and more specifically to reversible processes for image shredding.

BACKGROUND

There are a number of reasons to cryptographically obfuscate some or all of an image without loss of information. The image might be confidential between an individual sender and recipient. In other situations, the image might be part of a paid service, and this encoding can help ensure that only paying members can view the material.

SUMMARY OF THE INVENTION

Systems and methods for reversible, incremental image shredding are disclosed herein. Most people use cryptographic algorithms without knowing how they function. The processes described herein have visual interpretations with multiple intermediate steps. Thus the overall process can be visualized as an animation. By revealing intuitively the underlying mechanics of the encoding algorithm, the process is made transparent to the operator. This provides reassurance to those without a technical background in cryptographic algorithms so they feel more comfortable placing their trust in the security of the result.

One embodiment of the invention includes determining shredding parameters, generating a shredding map, where the shredding map is a grid of elements that indicates destination locations for at least two of the elements in the grid, and incrementally shredding the image by iteratively mapping blocks of pixels corresponding to grid elements of the shredding map to the destination locations indicated by the shredding map.

In a further embodiment, the shredding parameters include at least one parameter selected from the group consisting of the block size of each grid element, the seed of a random number generator, a parameter related to the generation of the shredding map, and a number of iterations to perform to shred the image.

In another embodiment, each grid element represents an exact subset of pixels from the input image.

In a still further embodiment, generating a shredding map further includes obtaining a zone map, where the zone map defines at least one zone within the grid, initializing a random number generator using a seed, and iteratively generating a localized pseudo-random offset for a plurality of the grid elements and determining a destination location for each of the plurality of grid elements using the localized pseudo-random offset.

In still another embodiment, each zone in the zone map has an equal number of grid elements.

In a yet further embodiment, the random number generator is seeded using a hash of a shared secret.

In yet another embodiment, the shared secret is a password.

In another embodiment again, determining a destination location for each of the plurality of grid elements further includes defining a modulation vector for each zone, and modulating the pseudo-random offset by adding a step along the modulation vector.

A further embodiment includes generating an animation visualizing the incremental shredding of the image.

In a further additional embodiment, at least one zone in which the pixels of the image are not shredded is defined in the shredding grid.

In another additional embodiment, the at least one zone in which the pixels of the image are not shredded is defined by assigning the grid elements corresponding to the zone with zero displacement in the shredding map.

In a still yet further embodiment, a separate shredding map is generated for each color channel.

In still yet another embodiment, the image is encoded in accordance with the JPEG file format, and the block size of the grid elements in the shredding map is determined based upon the block boundaries of the JPEG encoded image.

A still further embodiment again includes determining shredding parameters, generating a reverse shredding map, where the reverse shredding map is a grid of elements that indicates destination locations for at least two of the elements in the grid, and reversing the shredding of the image by iteratively mapping blocks of pixels corresponding to grid elements of the reverse shredding map to the destination locations indicated by the reverse shredding map.

In still yet another embodiment again, the shredding parameters include at least one parameter selected from the group consisting of the block size of each grid element, the seed of a random number generator, a parameter related to the generation of the reverse shredding map, and a number of iterations used to shred the image.

In a still further additional embodiment, determining shredding parameters includes extracting at least one shredding parameter from the file containing the image.

In another further embodiment, at least one of the shredding parameters is not contained within the image file.

In still another further embodiment, a least one of the shredding parameters is generated using a shared secret.

In yet another further embodiment, the shared secret is a password.

DETAILED DESCRIPTION

Turning now to the drawings, systems and methods for reversible, incremental image shredding in accordance with embodiments of the invention are illustrated. The term Qua-Coding (QC) can be used to describe processes for performing reversible, incremental shredding in accordance with embodiments of the invention. Given a two dimensional image, a QC shredding map (QC map) can be constructed and iteratively applied to the image using a computing device. This results in "image shredding": a visual obfuscation of the source image without actual loss of information. This shredded image can be locally stored on the computing device and/or transmitted to a third party via a communication network. Because the process is reversible, a QC shredded image can be completely restored to the original by specifying a small number of shredding parameters. In many embodiments, these shredding parameters can be attached to the image itself in order to automate decoding. In a number of embodiments, some of the shredding parameters are intentionally left out to introduce security or are encrypted so that the image can then only be unshredded by obtaining the QC parameter variables that are not included in the clear within the file.

Because of the incremental nature of QC processes, an operator has control over how much visual obfuscation to apply to the image. With a sufficient number of iterations, the image will be unrecognizable. However, with fewer iterations the image will vaguely resemble the original. Or with very few, the image will seem only slightly affected. This ability to control the level of visual disfigurement could be beneficial; for example: critical details could be hidden while still allowing the overall image to be recognizable such that it could be selected from other images, even by persons without the decryption keys. Furthermore, the extent of shredding can be controlled by controlling the block size utilized during shredding, shredding only portions of the image and/or by separately shredding each color channel in a multi-channel image.

QC processes in accordance with embodiments of the invention have other potential uses outside of ensuring message confidentially, as QC processes implement a general cryptographic algorithm and such algorithms are known to be useful in addressing a range of domains. As one example, a QC process could be used as part of a cryptographic signature to establish authentication, data integrity, or non-repudiation of origin. QC processes and systems that implement QC processes in accordance with embodiments of the invention are discussed further below.

Performing Reversible, Incremental Image Shredding

Figure 1:
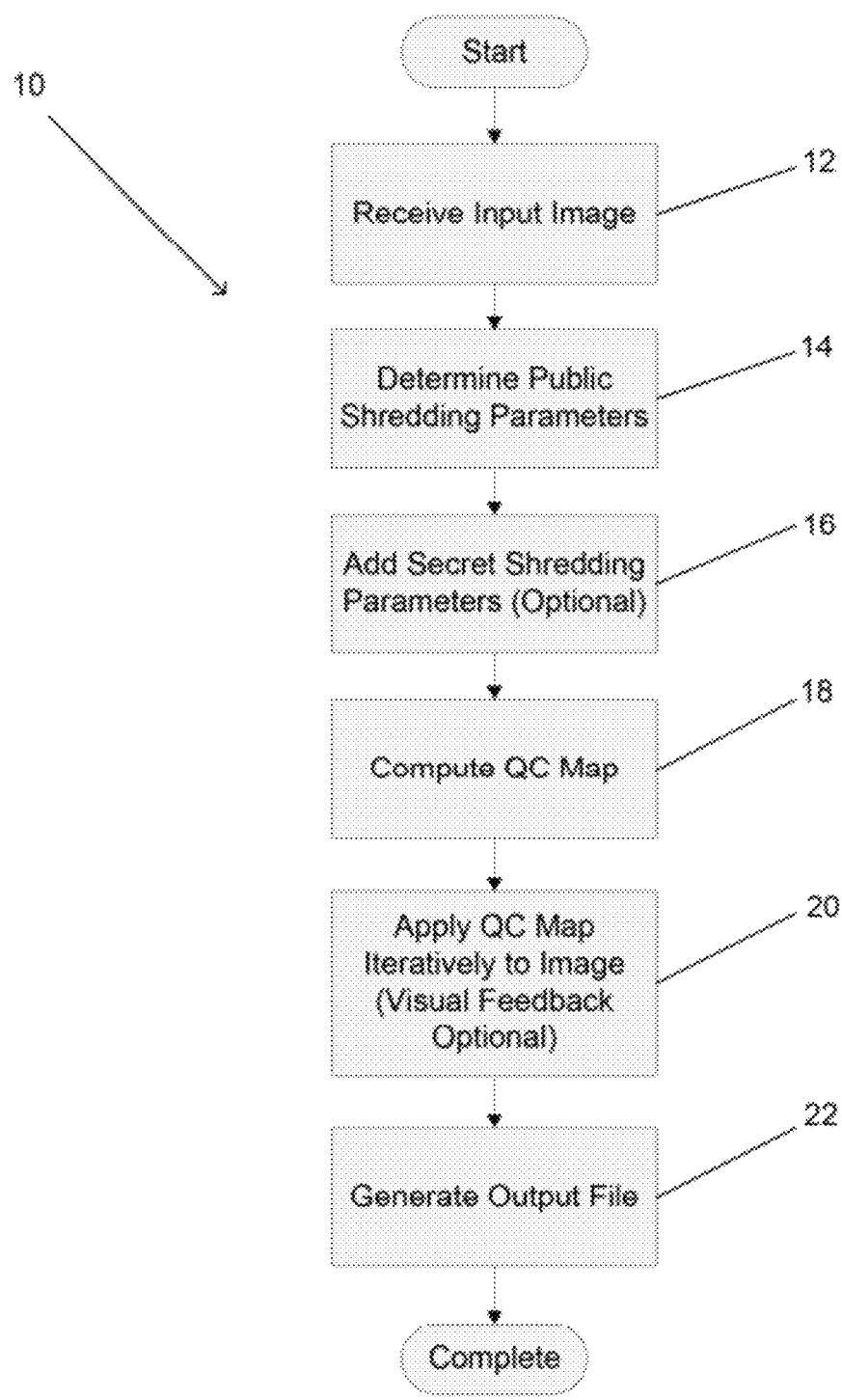
FIG. 1 is a flow chart illustrating a process for reversibly, incrementally shredding an image in accordance with an embodiment of the invention.

A QC process in accordance with an embodiment of the invention is illustrated FIG. 1. The QC process 10 includes receiving (12) an input image and determining (14) a public set of shredding parameters. In several embodiments, additional secret or private shredding parameters are also determined (16). Where the image is desired to be generally accessible, the QC process utilizes a set of public shredding parameters that are typically passed with the shredded image file in the clear. Where access to the image is intended to be restricted, secret shredding parameters can be utilized in the QC process and the secret shredding parameters can be encrypted and/or communicated separately from the shredded image file.

Once a set of shredding parameters is defined, a QC map can be computed (18). A QC map is a grid in which each element is shuffled to or assigned some other element of the grid. This shuffle can be visualized as a directed vector from one element to another in the grid. A QC map in accordance with an embodiment of the invention is conceptually illustrated in FIG. 2. In the illustrated embodiment, the QC map 30 includes eight map elements 32 and a set of vectors 34 indicate the assignments of the blocks in the overall grid. When a QC map is applied to an image, each map element represents one or more pixel elements of the source image. As is discussed further below, the same QC map can be iteratively applied to a source image, resulting in a cumulative distortion effect as each map element moves progressively further away from its original location within the image.

Figure 3A:
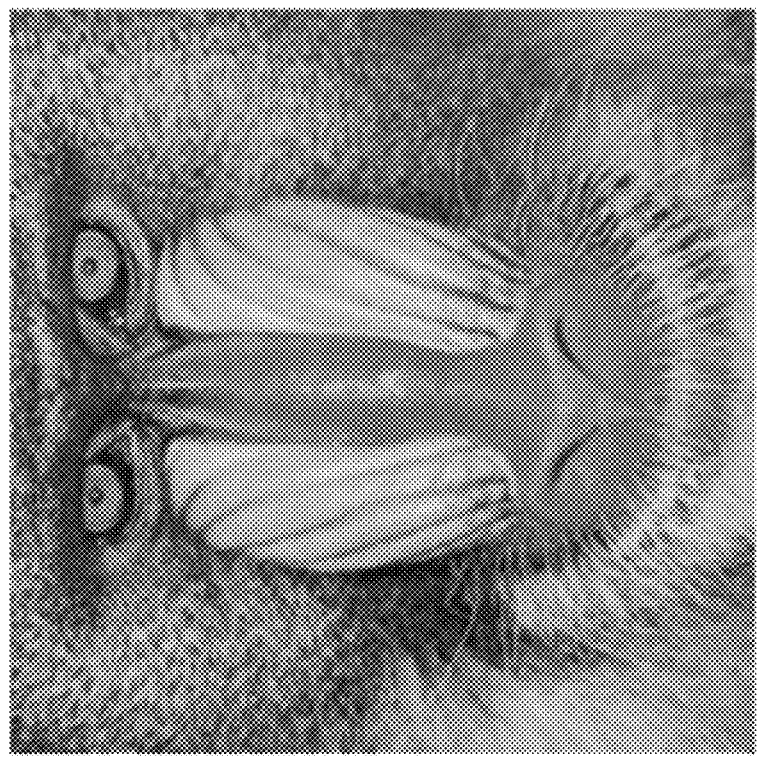
FIGS. 3A-3E illustrate an original image (FIG. 3A), one (FIG. 3B), three (FIG. 3C), seven (FIG. 3D) and fifteen (FIG. 3E) iterations of the application of a QC map in accordance with an embodiment of the invention.
Figure 3C:
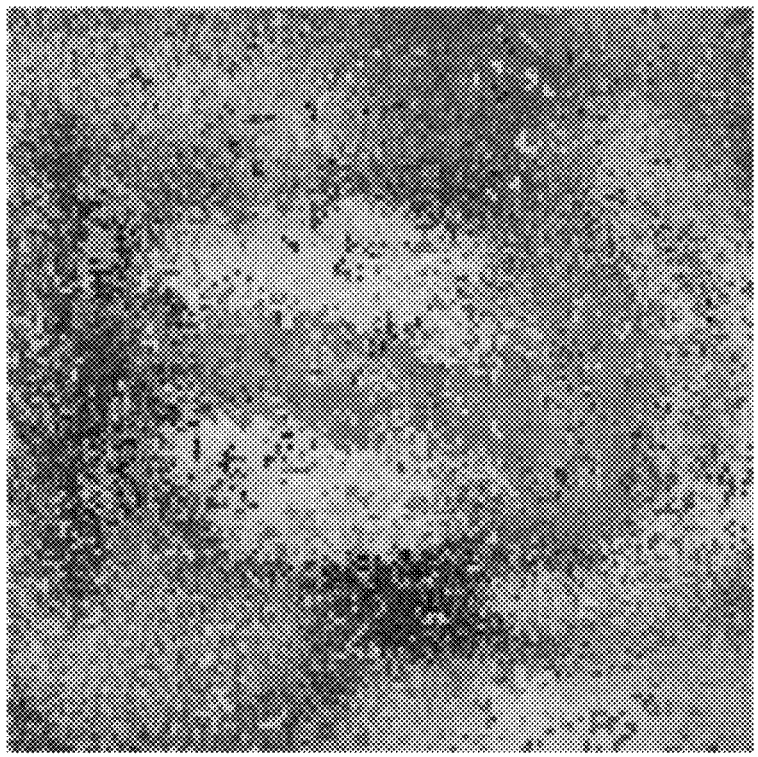
Figure 3B:
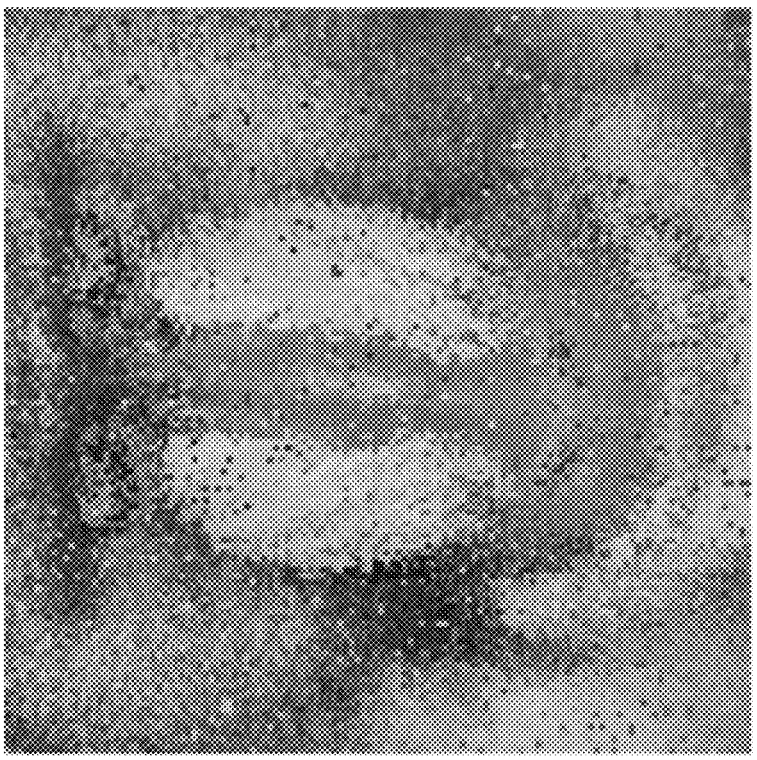
Figure 3E:
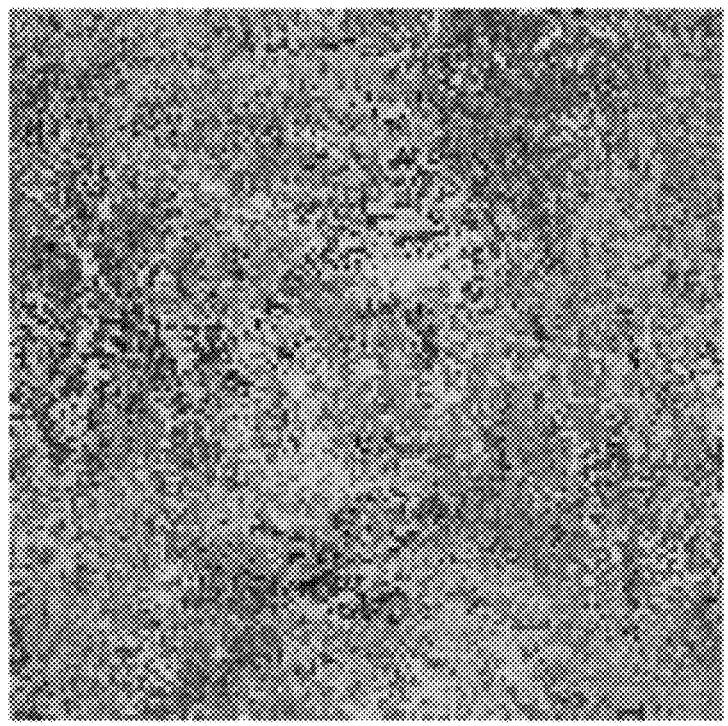
Figure 3D:
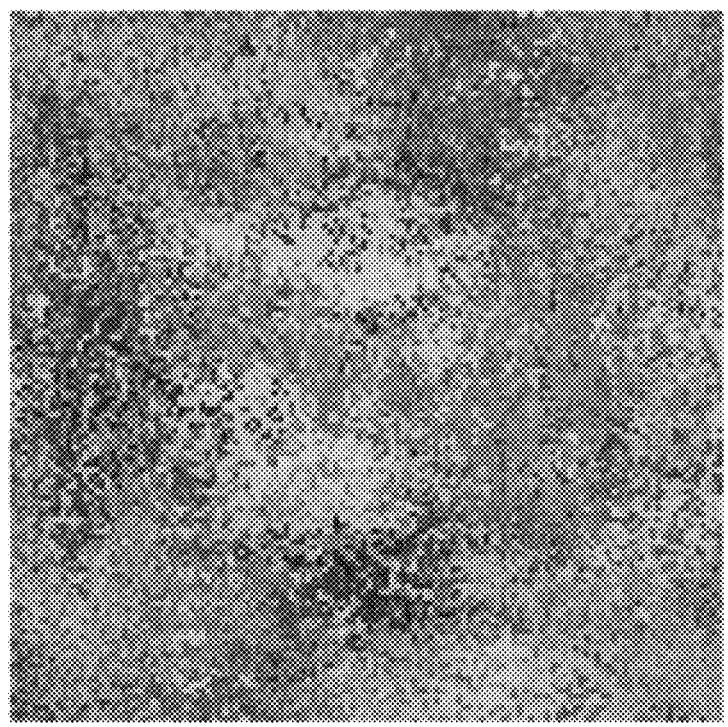

Referring back to FIG. 1, the computation of the QC map enables the application (20) of the QC map iteratively to the image. In many embodiments, the user interface of the computing device performing the QC process can provide visual feedback at various iterations. The visual appearance of an image as it shreds can be appreciated with reference to FIGS. 3A-3E, which illustrate an original image (FIG. 3A), one (FIG. 3B), three (FIG. 3C), seven (FIG. 3D) and fifteen (FIG. 3E) iterations of the application of the QC map. As can be appreciated from a review of FIGS. 3A-3E, increasing numbers of iterations increases the distortion or shredding of the image.

Once the QC map has been iteratively applied to the image, an output file can be generated. In several embodiments, the set of shredding parameters are included in the file. In many embodiments, private shredding parameters are encrypted prior to inclusion in the file. In a number of embodiments, some or all of the shredding parameters are communicated separately from the shredded image file. As can readily be appreciated, the process shown in FIG. 1 can be reversed using the shredding parameters. The process of reversing the shredding process shown in FIG. 1 is discussed further below.

Both the input and output of QC processes, such as the QC process illustrated in FIG. 1, are images. Therefore, the encoded image file output by the QC process remains compatible with its enclosing context and processes that are applicable to images. Most use of digital images involves interaction with surrounding context and processes. An algorithm to cryptographically encode an image can be of limited use if it diminishes the processes in which the encoded image can be used or if it changes the parameters of the original image. QC processes in accordance with embodiments of the invention do not change the functional identity of the image file itself— the image remains an image to the surrounding context. Furthermore, the image retains several of its original characteristics, such as the size and overall color histogram. This congruence in file type and size allows the encoded or shredded image to be used as part of a web document layout, and then decoded in place without altering surrounding content. Other examples of where the persistence of image identity is useful include (but are not limited to) for use as e-mail attachments, MMS messaging, or interoperating with any other process that expects to interact with digital image files.

Figure 2:
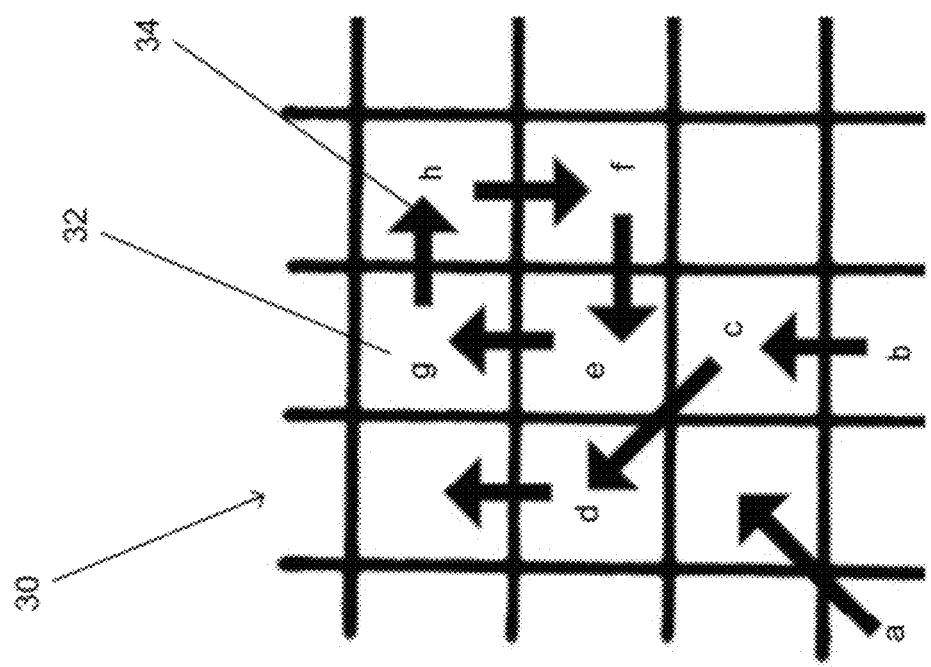
FIG. 2 is a conceptual illustration of the shuffling of pixels performed by a QR map in accordance with an embodiment of the invention.

Although a specific QC process is illustrated in FIG. 2, any of a variety of QC processes can be utilized to reversibly and incrementally shred images in accordance with embodiments of the invention. QC processes and processes for generating QC maps in accordance with embodiments of the invention are discussed further below.

Generating QC Maps

Figure 4:
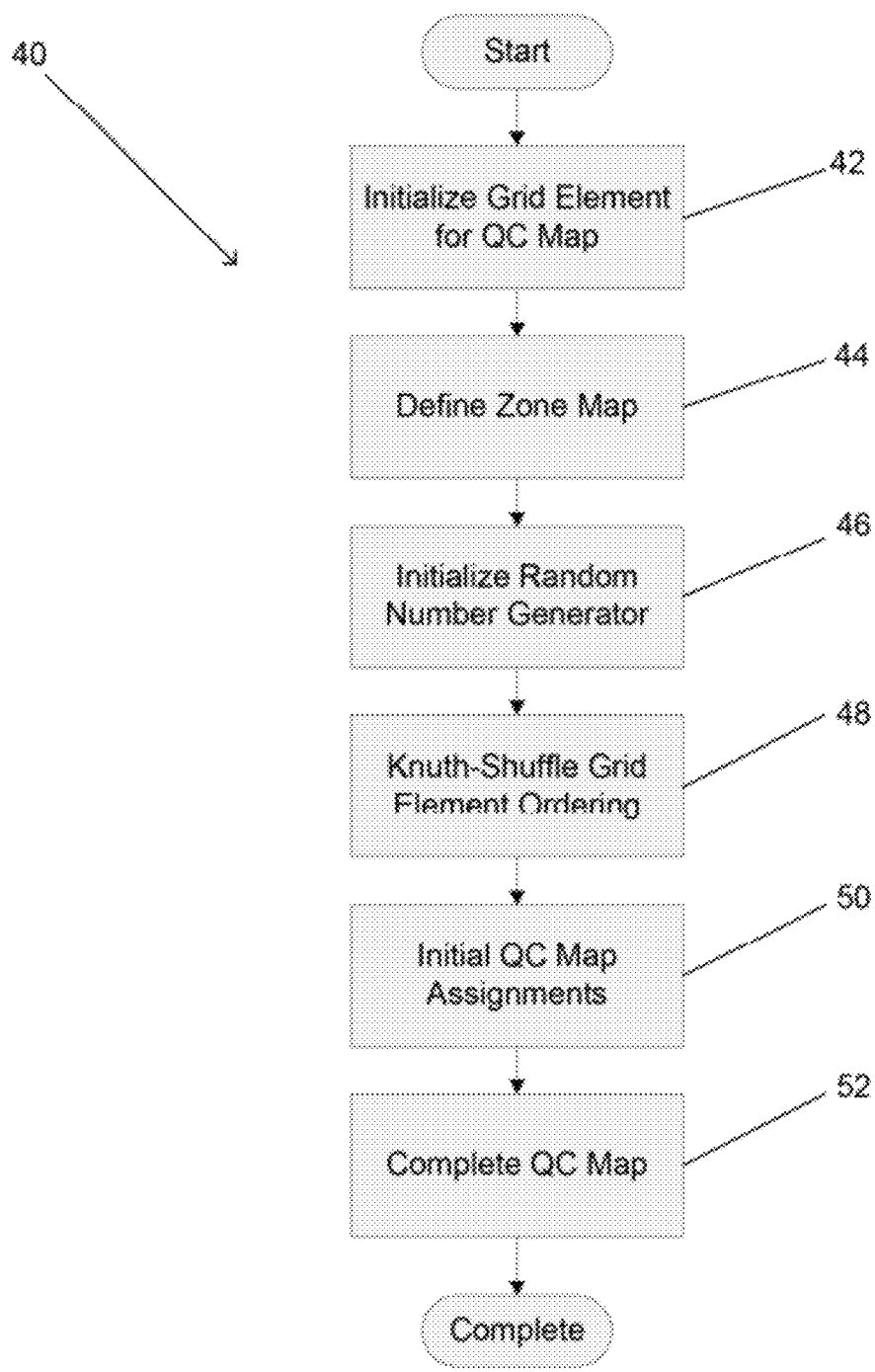
FIG. 4 is a flow chart illustrating a process for generating a QC map in accordance with an embodiment of the invention.
Figure 5:
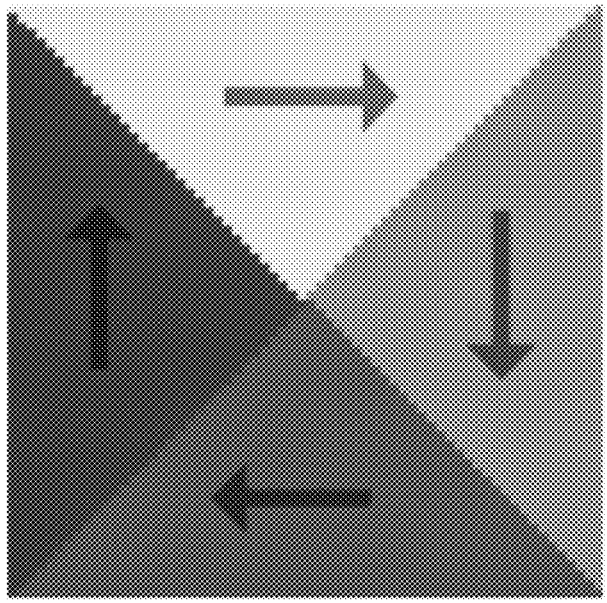
FIG. 5 conceptually illustrates a zone map and the modulation vector defined for each zone map in accordance with an embodiment of the invention.

Given the general framework discussed above with respect to FIG. 1, there are several ways to concretely implement a QuaCoding process in accordance with an embodiment of the invention. A particular QuaCoding implementation has the freedom to decide the exact nature of the QC map and can also implement any number of extensions to the core processes. A process for generating a QC map in accordance with an embodiment of the invention is illustrated in FIG. 4, which highlights concrete design choices that can be made within the general framework of a QuaCoding process. The process 40 includes determining (42) the size of the grid element for the quantization map so that each grid element represents an exact subset of pixels from the input image. The QC map can then be stored in a rectangular array called grid[width] [height]. A zone map can then be defined (44). In many embodiments, a zone map is a data structure that is used to provide a global shuffle motion when shredding by providing each of the zones in the QC map with a different stochastic default motion. A zone map in accordance with an embodiment of the invention is illustrated in FIG. 5. In many embodiments, the zone map defines a plurality of zones within the QC map. In several embodiments, the zone map has the property that each zone has an equal number of QC grid elements. In a number of embodiments, the zone map also has the geometric property that the default motion of each pixel within a zone leads either to the same zone or to a single predetermined neighbor. Conversely, it is possible to define a zone map with a single zone in which a common modulation vector is applied to all elements during the shredding and un-shredding processes. In this way, the default zone motion perceptually appears coherent across the image. In several embodiments, the coherent default motion appears as clockwise or counter-clockwise rotation about the zone origin. In other embodiments, any of a variety of constraints can be applied to the zone map.

Psuedo-random numbers are utilized in subsequent steps of the process. Therefore, a random number generator (RNG) is initialized (46) into a known state. The QC map grid[width] [height] includes a known number of grid elements, denoted numelems. The RNG can be used to create and store a psuedo-random ordering of all grid elements using a standard Knuth-shuffle process (48). The Knuth-shuffle process (also known as the Fischer-Yates shuffle) is as follows:

To shuffle an array a of n elements (indexes 0 . . . n−1):
for i from n−1 down to 1 do
  j←random integer with 0≤j≤i
  exchange a[j] and a[i]

Any arbitrary ordering of a two dimensional array of elements can be used as input to the shuffle. Values indicative of destination locations are assigned (50) to grid elements in the QC map and the QC reverse map (see discussion of QC reverse map below). In each location grid[x] [y] is a two dimensional signed integer offset [dx, dy] which points to a different grid location. Given an entire grid[width] [height] set of data, a reverse QC map can always be constructed to be the inverse transformation, where in each location reverse_grid[x+dx][y+dy] is a two dimensional signed integer offset [−dx, −dy].

Figure 6:
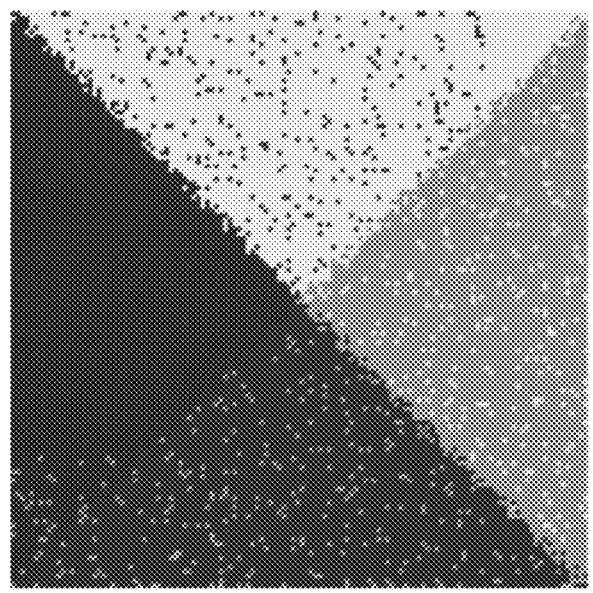
FIG. 6 conceptually illustrates the assignment of destination locations to grid elements within the QC map that are in an adjacent zone.

In a number of embodiments, the initial step in constructing the forward QC map is to iterate through each possible x, y location assigning a localized pseudo-random offset. In several embodiments, the actual offset chosen can be one of twenty possible nearby locations, each within three units in Manhattan distance. This initial determination of an offset of equal probability in each direction is modulated by adding a single step along a vector determined by the zone map for that grid element. The result is a proposed offset location with an overall probabilistic vector provided by the zone map. This offset location is committed to the forward and reverse QC maps if the destination location [x+offset] [y+offsety] has not already been previously claimed by some other [x2, y2] source. In a number of embodiments, the overall iteration is done a total of four times and each of the iterations can use the ordering from the random number generator. At the end of the iterations, a significant proportion of grid elements (approximately 94% of [x, y] grid elements for four iterations) have obtained an entry in the forward QC map. At which point, the QC map can be completed (52) by identifying grid elements that have not been assigned offsets in the QC map and assigning these grid elements to available offsets. In contrast to the local offsets assigned in the above iterations, the assigned offsets are found by jumping to an available destination in a neighboring zone. In the embodiment illustrated in FIG. 6, the destination is found in the next clockwise zone. In many embodiments, the assignment of these leftovers to the next zone clockwise balances the need for visually localized transformations with an overall shred process that is able to mix well in a small number of steps.

The application of a QC map generated using the process outlined in FIG. 5 is illustrated in FIGS. 3A-3E. As can readily be appreciated, the shredding process appears to mix the pixels of the original image in a clockwise direction until the original image is shredded to an extent that its content cannot be readily discerned (i.e. the picture looks like a somewhat random distribution of pixels). Although a specific process is discussed above with respect to FIG. 5 involving a specific approach for randomly shuffling grid elements of the QC map and a specific number of iterations of the shuffling process to obtain the QC map, any of a variety of processes for generating QC maps can be utilized in accordance with embodiments of the invention that involve the generation of a QC map that involves assigning a plurality of grid elements to destinations. Processes for reversing the shredding of an image in accordance with an embodiment of the invention are discussed further below.

Reversing the Shredding of an Image

Figure 7:
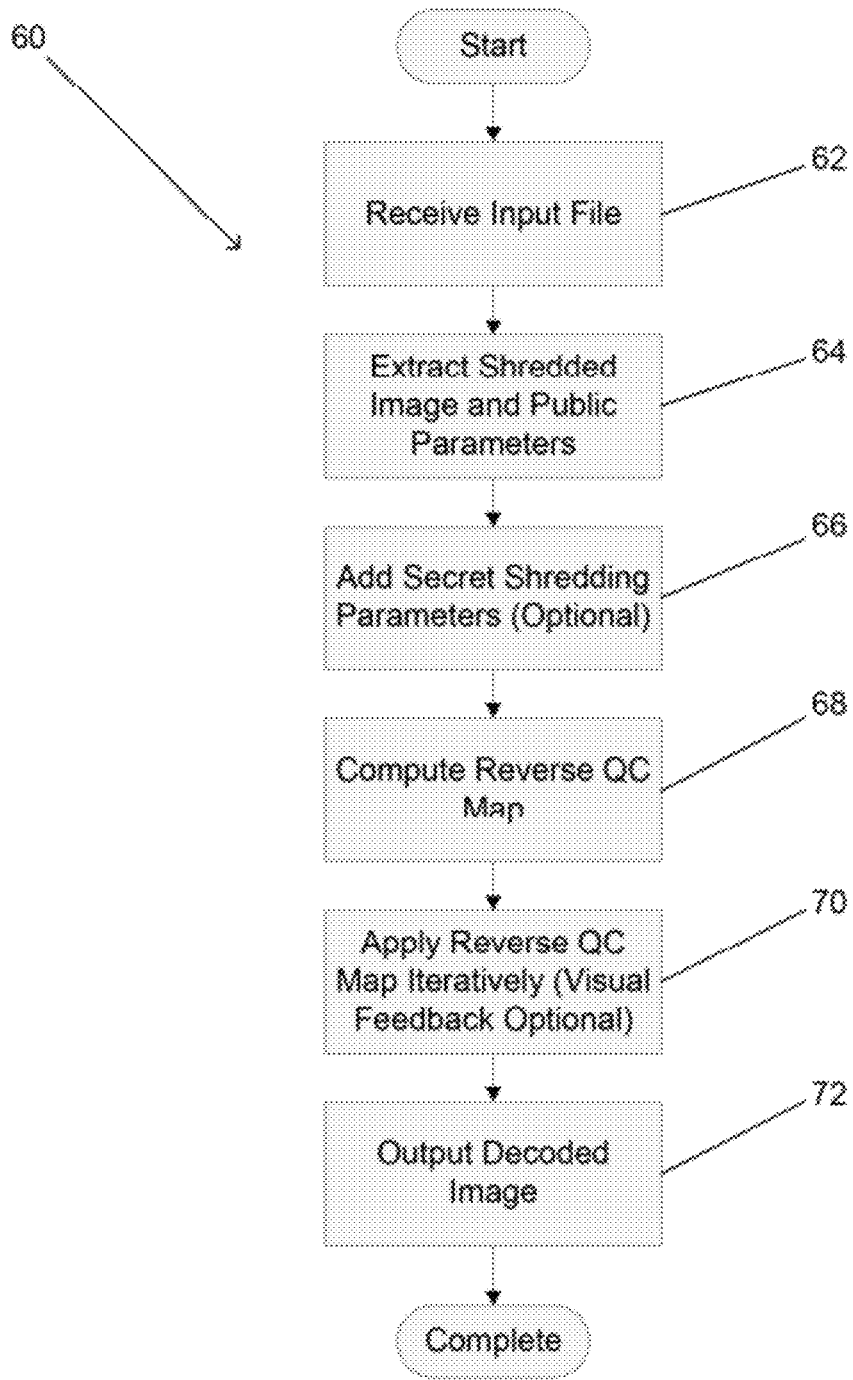
FIG. 7 is a flow chart illustrating a process for reversing the shredding of an image in accordance with an embodiment of the invention.
Figure 8:
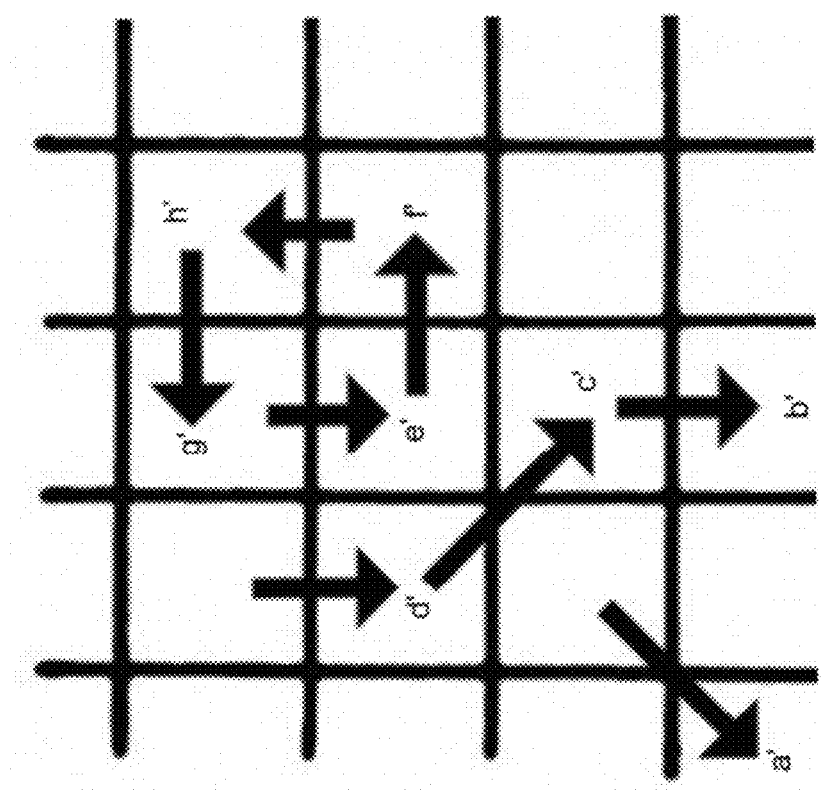
FIG. 8 conceptually illustrates a reverse shredding map in accordance with an embodiment of the invention.

An image that has been shredded using a process similar to the QC processes outlined above can be reconstructed by reversing the QC process. A process for reversing incremental shredding of an image in accordance with an embodiment of the invention is illustrated in FIG. 7. The process 60 involves receiving (62) an input file and extracting (64) the shredded image and the shredding parameters. As discussed above, some or all of the shredding parameters can be public and some or all of the shredding parameters can be secret. Where at least one of the shredding parameters is secret, the process obtains the secret shredding parameter and adds (66) the secret shredding parameters to any of the public shredding parameters to compute (68) the reverse QC map. Processes for computing QC maps and reverse QC maps in accordance with embodiments of the invention are discussed above. A reverse QC map of the QC map illustrated in FIG. 2 is shown in FIG. 8, with the corresponding reverse destination vectors. The reverse QC map is iteratively applied (70) to the shredded image and, in many embodiments, visual feedback is provided as the iterations are applied. When the appropriate number of iterations has been performed to obtain the original image, the image is output (72).

Although a specific process for decoding an image that has been incrementally shredded using a QC process is discussed above with respect to FIG. 7, any process that is a reverse of the QC process used to shred the image can be utilized in accordance with embodiments of the invention.

Pre-Computing Map Multiplication

When encoding or decoding an image, a single QC map or reverse QC map is applied to the image for a number of iterations to arrive at the final image. As noted above, these interim steps can be displayed graphically to produce a coherent shredding or un-shredding animation. However, it is not always desired to display or otherwise use these interim values. In many embodiments, a composite QC map can be constructed that represents the iteration of the original QC map a predetermined number of times. The operation can be referred to as map multiplication since any given QC map can easily be iterated by an integer constant k to produce a new QC map, which exactly represents the application of the original map applied k times. Computing the map multiplication is very efficient and a quicker way to encode an image a known number of iterations, which is usually the case when reversing the shredding applied by a QC shredding process.

Secret Key

In several of the processes described above, a random number generator (RNG) is used that is set to the same, known state. However, there is an option to initialize the RNG into a unique state based on an input password. As long as the same RNG initial state is used for encoding and decoding, the same QC shredding map will be constructed and the QC process will remain reversible. Conversely, if a different RNG initial state is used, then decoding will fail and instead any attempt to decode the image will instead simply have the effect of further shredding the image.

In this way, the QC process enables the password to be used for security purposes. The RNG seed is the result of a cryptographic hash function on the password. This string is provided at both the encode and decode times as it is the shared secret information used when decoding the image. In this way, the RNG is an example of a secret QC parameter.

Safe Zones

Figure 9A:
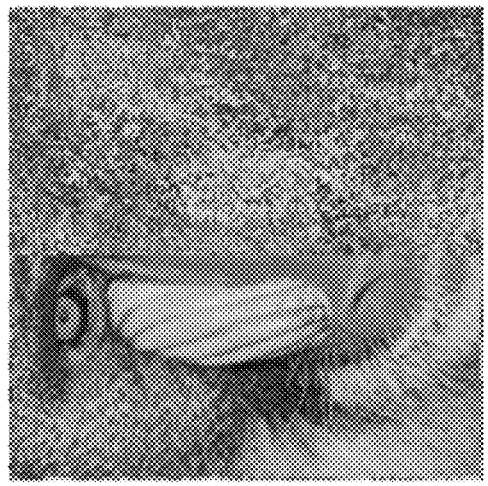
FIGS. 9A-9C illustrate images shredded using QC processes in accordance with embodiments of the invention that include safe zones.
Figure 9B:
Figure 9C:
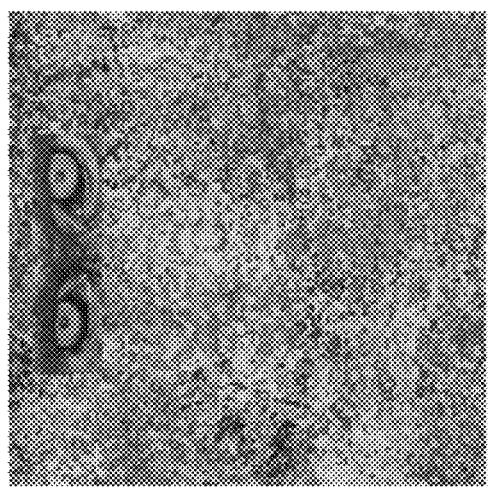

QC processes in accordance with several embodiments of the invention exempt a subset of the input image from the transformation process. This is done by pre-seeding locations in the QC map with the null [0, 0] offset. Examples of images shredded using QC processes in accordance with embodiments of the invention that include safe zones are illustrated in FIGS. 9A-9C. Although only a single safe zone is illustrated in each of the shredded images, any of a number of safe zones can be defined by a QC process in accordance with embodiments of the invention.

Varying Block Size

As discussed above, the pixels in a source image are aligned to the elements of the QC map by simply dividing the height and width of the image by a fixed integer number. This number can be different for the height and width dimensions of the image and can be denoted as BlockSizeX and BlockSizeY. In many embodiments of the invention, BlockSizeX and BlockSizeY are shredding parameters that can be freely defined. At an extreme, each block might represent one pixel element each. But it is possible to instead use larger block size numbers to reduce the resolution of the QC maps. Often larger block sizes will result in a much quicker computation of both the shredding maps and their graphical animation in an application. A number of images shredded using shredding maps having different block sizes in accordance with embodiments of the invention are illustrated in FIGS. 10A-10D.

Specifying a large block size can often result in a modification of the original width or height to ensure that the image dimensions are multiples of the block size. When this modification is performed, the image is typically kept in the top left corner with all positions image[x][y] being retained and new dummy entries added elsewhere. When the reverse mapping is applied, the image can again be cropped to the original width and height.

Channel Separation

Figure 11:
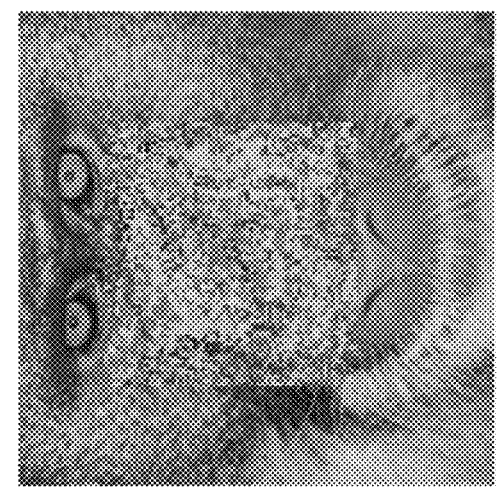
FIG. 11 is an image shredded using a process that incrementally applies a shredding map to each of the different color channels of the image in accordance with an embodiment of the invention.
Figure 10A:
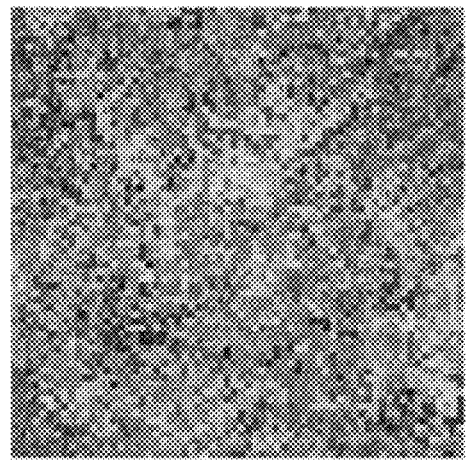
FIGS. 10A-10D are images shredded using shredding maps having different block sizes in accordance with embodiments of the invention.
Figure 10B:
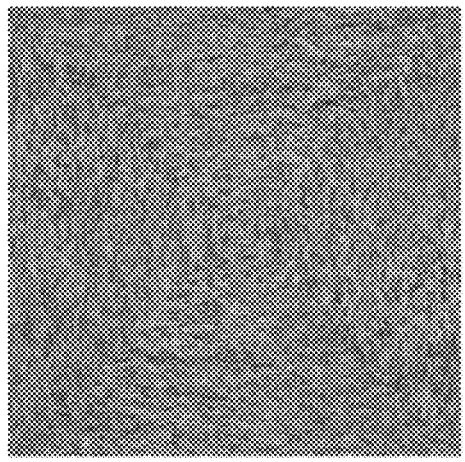
Figure 10C:
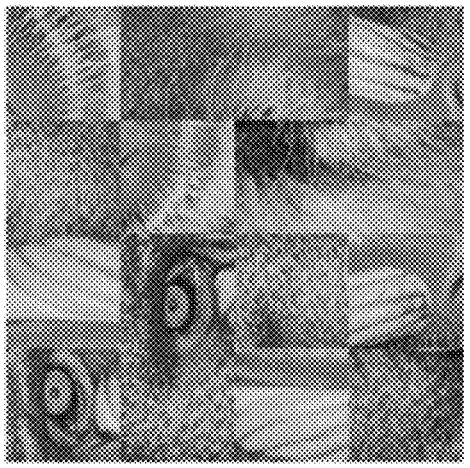
Figure 10D:
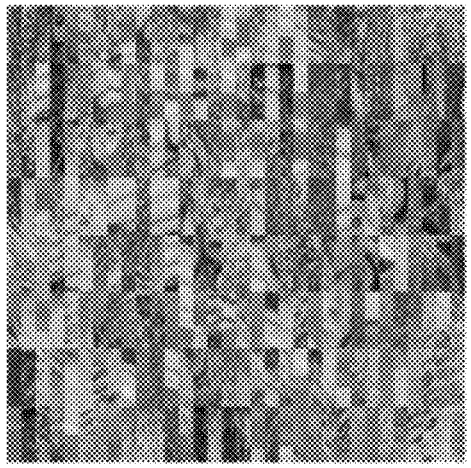

QC processes in accordance with embodiments of the invention are generally independent of the image color type and move pixel elements in the same way irrespective of whether they represent grayscale, indexed color, or multi-channel input. Applying the QC process in this way results in a scrambled image with an overall identical color histogram as the original input image. For multi-channel images, however, the color information can also be obfuscated using a QC process by shredding each of the color channels separately using a different QC process. The impact of separately applying a QC process to each color channel can be appreciated by comparing FIG. 11 and FIG. 3E. Both images involve application of a QC map for 15 iterations to FIG. 3A. In the image shown in FIG. 3E, the pixels are treated independently of color and in the image shown in FIG. 11 each color channel is shredded separately. As can readily be appreciated the color histogram of FIG. 11 no longer corresponds to the color histogram of FIGS. 3A and 3E. Accordingly, a greater level of obfuscation of the original content is achieved.

Picture-in-Picture

The QC processes discussed above generally result in shredded images that appear to involve the random shredding of image blocks. However, it is possible to subsequently encode the shredding image into a second image, which can camouflage the fact that the image is an encoded state.

Fractional QC Maps

When a QC map is applied, each element in the input grid is shifted by the offset for that location in the QC map. However, it is also possible to shift only a subset of the elements in the total grid if care is taken to account for all grid positions. This ability to partially apply a QC map depends on generating an interim map called a fractional map. The fractional map represents a percentage of the way through a single iteration. The iteration order can be defined by the stored Knuth-shuffle pixel ordering. This is useful in contexts such as wanting to produce an interpolated animation across a small number of iterations or if the end user wants very fine control over the number of iterations applied (e.g. "more than 2 but less than 3"). In many embodiments, Fractional Maps are enabled by providing an additional QC Parameter to indicate the amount of fractional iteration along with the existing number of non-fractional iterations.

Lossless JPEG Shredding

QC processes in accordance with embodiments of the invention are compatible with the widely used JPEG file format specified by the Joint Picture Experts Group. In many embodiments, the grid element block size dimension x and y are provided as QC Parameters. However, when opening a JPEG file, QC processes in accordance with many embodiments of the invention can fix the grid element block size based on the input JPEG image's known block boundaries. Then by applying the offset transformations to blocks that exactly match the jpeg blocks, the image can be transformed and saved without requiring decompression and re-compression of individual jpeg blocks. The result is an image that can be recovered exactly with no loss of quality. Similar processes can also be utilized with other image encoding formats in accordance with embodiments of the invention.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed:

1. A method for reversible, incremental shredding of an image using a computing device, comprising:
   determining shredding parameters;
   generating a shredding map, where the shredding map is a grid of elements that indicates destination locations for at least two of the elements in the grid; and
   incrementally shredding the image by iteratively mapping blocks of pixels corresponding to grid elements of the shredding map to the destination locations indicated by the shredding map;
   wherein generating a shredding map further comprises:
   obtaining a zone map, where the zone map defines at least one zone within the grid;
   initializing a random number generator using a seed; and
   iteratively generating a localized pseudo-random offset for a plurality of the grid elements and determining a destination location for each of the plurality of grid elements using the localized pseudo-random offset.

2. The method of claim 1, wherein the shredding parameters comprise at least one parameter selected from the group consisting of the block size of each grid element, the seed of a random number generator, a parameter related to the generation of the shredding map, and a number of iterations to perform to shred the image.

3. The method of claim 1, wherein each grid element represents an exact subset of pixels from the input image.

4. The method of claim 1, wherein each zone in the zone map has an equal number of grid elements.

5. The method of claim 1, wherein the random number generator is seeded using a hash of a shared secret.

6. The method of claim 5, wherein the shared secret is a password.

7. The method of claim 1, wherein determining a destination location for each of the plurality of grid elements further comprises:
   defining a modulation vector for each zone; and
   modulating the pseudo-random offset by adding a step along the modulation vector.

8. The method of claim 1, further comprising generating an animation visualizing the incremental shredding of the image.

9. The method of claim 1, wherein at least one zone in which the pixels of the image are not shredded is defined in the shredding grid.

10. The method of claim 9, wherein the at least one zone in which the pixels of the image are not shredded is defined by assigning the grid elements corresponding to the zone with zero displacement in the shredding map.

11. The method of claim 1, wherein a separate shredding map is generated for each color channel.

12. The method of claim 1, wherein:
   the image is encoded in accordance with the JPEG file format; and
   the block size of the grid elements in the shredding map is determined based upon the block boundaries of the JPEG encoded image.

13. The method of claim 1, wherein a successive number of iterations of the iterative mapping of blocks of pixels corresponding to grid elements of the shredding map to the destination locations indicated by the shredding map is controllable to determine the amount of visual obfuscation applied to the image.

14. The method of claim 13, wherein the successive number of iterations of the iterative mapping of blocks of pixels corresponding to grid elements of the shredding map to the destination locations indicated by the shredding map is a shredding parameter used to successfully decode the image.

15. The method of claim 1, further comprising generating an animation visualizing the successive incremental shredding of the image.

* * * * *